United States Patent
Watanabe et al.

(10) Patent No.: US 12,051,925 B2
(45) Date of Patent: Jul. 30, 2024

(54) CHARGING CONTROL METHOD OF A BATTERY PACK FOR PORTABLE ELECTRONIC DEVICES

(71) Applicant: Lenovo (Singapore) Pte. Ltd., Singapore (SG)

(72) Inventors: Hiroyuki Watanabe, Kanagawa (JP); Hideshi Tsukamoto, Kanagawa (JP); Hiromitsu Yamaguchi, Kanagawa (JP); Daisuke Arai, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 439 days.

(21) Appl. No.: 17/352,759

(22) Filed: Jun. 21, 2021

(65) Prior Publication Data

US 2022/0407332 A1 Dec. 22, 2022

(51) Int. Cl.
*H02J 7/00* (2006.01)
(52) U.S. Cl.
CPC ........ *H02J 7/00304* (2020.01); *H02J 7/0013* (2013.01); *H02J 7/0048* (2020.01)
(58) Field of Classification Search
CPC .... H02J 7/00304; H02J 7/0013; H02J 7/0048; H02J 7/00047; H02J 7/00714
(Continued)

(56) References Cited

U.S. PATENT DOCUMENTS 7,449,864 B2 * 11/2008 Kwon ................... H02J 7/0048
320/132
7,605,565 B2 * 10/2009 Wozniak ........... H01M 10/4207
320/136
(Continued)

FOREIGN PATENT DOCUMENTS

| CN | 105529690 B | * | 3/2019 |
|----|---|---|---|
| CN | 115411803 A | * | 11/2022 |
| EP | 3206279 B1 | * | 11/2020 |
| JP | 2006320170 A | * | 11/2006 |
| JP | 2007236089 A | * | 9/2007 |
| JP | 2008048600 A | * | 2/2008 |
| JP | 6263908 B2 | * | 1/2018 |

OTHER PUBLICATIONS

M. F. M. Elias, K. M. Nor, N. A. Rahim and A. K. Arof, "Lithium-ion battery charger for high energy application," Proceedings. National Power Engineering Conference, 2003. PECon 2003., Bangi, Malaysia, 2003, pp. 283-288, doi: 10.1109/PECON.2003.1437458. (Year: 2003).*

(Continued)

*Primary Examiner* — M Baye Diao
(74) *Attorney, Agent, or Firm* — Osha Bergman Watanabe & Burton LLP (57) ABSTRACT

A method for controlling a charging of a battery pack for a portable electronic device. The battery pack includes one or more cell blocks, each having a plurality of battery cells connected in parallel. The method includes the following steps. Determining, for each of the one or more cell blocks, a value of a first charging current flowing through a first battery cell that has the smallest capacity among the plurality of battery cells. Comparing, for each of the one or more cell blocks, the value of the first charging current with a first overcurrent value of the first battery cell to detect overcurrent in the first battery cell. Generating, in response to detecting the overcurrent in the first battery cell of any of the one or more cell blocks, a first overcurrent signal to reduce a total charging current of the battery pack.

12 Claims, 8 Drawing Sheets

(58) Field of Classification Search
USPC .......................................................... 320/162
See application file for complete search history.

(56) References Cited

U.S. PATENT DOCUMENTS

| | | | | |
|---|---|---|---|---|
| 7,642,753 | B2* | 1/2010 | Simpson | H02J 7/0013 |
| | | | | 320/132 |
| 9,036,383 | B2* | 5/2015 | Yabuzaki | H02M 1/32 |
| | | | | 323/284 |
| 10,211,653 | B2* | 2/2019 | Kadirvel | H02J 7/0029 |
| 10,601,242 | B2* | 3/2020 | Lu | H02J 7/04 |
| 10,910,847 | B2* | 2/2021 | Grasshoff | H02J 7/0016 |
| 11,196,334 | B2* | 12/2021 | Sato | H02M 3/335 |
| 2007/0063671 | A1* | 3/2007 | Simpson | H02J 7/0013 |
| | | | | 320/116 |
| 2023/0179005 | A1* | 6/2023 | Lee | H02J 7/00304 |
| | | | | 320/134 |

OTHER PUBLICATIONS

J. Cao and A. Emadi, "Batteries Need Electronics," in IEEE Industrial Electronics Magazine, vol. 5, No. 1, pp. 27-35, Mar. 2011, doi: 10.1109/MIE.2011.940251. (Year: 2011).*

* cited by examiner

CHARGING CONTROL METHOD OF A BATTERY PACK FOR PORTABLE ELECTRONIC DEVICES

BACKGROUND

Battery packs provide power to portable electronic devices such as notebooks and laptop computers. Such a battery pack includes a plurality of identical battery cells (i.e., battery cells of equal size, capacity, and impedance) and a fuel gauge or battery management system that monitors the current, voltage, and temperature of the battery cells and monitors the state of the overall battery pack, including its charge state. Battery packs, however, are susceptible to degradation. In case of excess degradation, a capacity of the battery pack decreases, which results in shorter discharge cycles.

SUMMARY

In general, one or more embodiments of the invention relate to a method for controlling a charging of a battery pack for a portable electronic device, wherein the battery pack comprises one or more cell blocks each comprising a plurality of battery cells connected in parallel, the method comprising: determining, for each of the one or more cell blocks, a value of a first charging current flowing through a first battery cell that has the smallest capacity among the plurality of battery cells; comparing, for each of the one or more cell blocks, the value of the first charging current with a first overcurrent value of the first battery cell to detect overcurrent in the first battery cell; and generating, in response to detecting the overcurrent in the first battery cell of any of the one or more cell blocks, a first overcurrent signal to reduce a total charging current of the battery pack.

In general, one or more embodiments of the invention relate to a battery pack for a portable electronic device, comprising: one or more cell blocks each comprising a plurality of battery cells connected in parallel; and a fuel gauge that: determines a value of a first charging current flowing through a first battery cell that has the smallest capacity among the plurality of battery cells, compares the value of the first charging current with a first overcurrent value of the first battery cell to detect overcurrent in the first battery cell, and generates, in response to detecting the overcurrent in the first battery cell, a first overcurrent signal to reduce a total charging current of the battery pack.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention relate to a method for controlling charge of a battery pack for a portable electronic device, and a battery pack with charge control for a portable electronic device.

Figure 1:
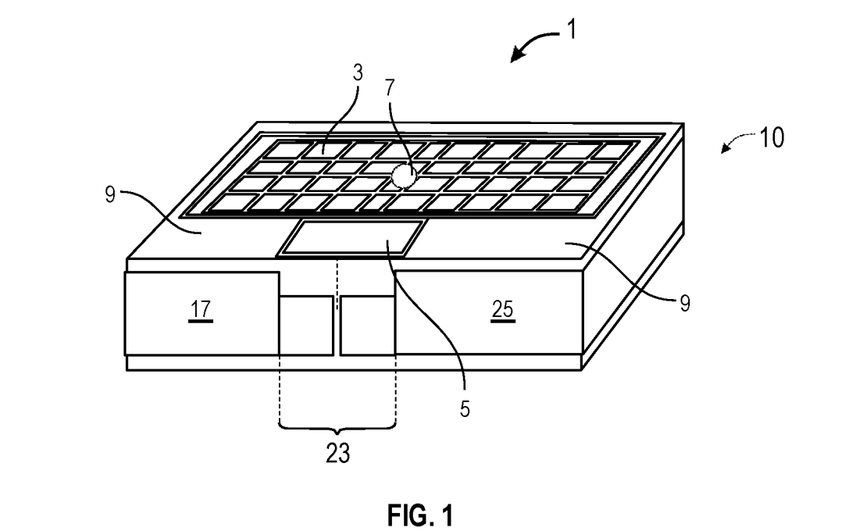
FIG. 1 shows a perspective view of a battery pack according to one or more embodiments.

FIG. 1 shows a partial perspective view of a portable electronic device 1 according to one or more embodiments. In this example, the portable electronic device 1 is a laptop comprising a battery pack 10, a keyboard 3, a trackpad 5, a TrackPoint® 7, and palm rests 9. The battery pack 10 has a first battery compartment 17, a second battery compartment 23, and a third battery compartment 25.

Figure 2:
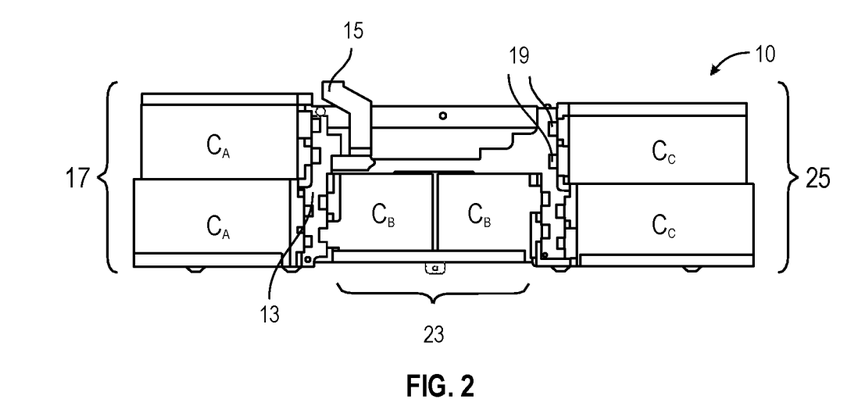
FIG. 2 shows a top view of the battery pack of FIG. 1 according to one or more embodiments.

FIG. 2 shows a top view of the battery pack 10 of FIG. 1 according to one or more embodiments. As shown, the battery pack 10 comprises two battery cells $C_A$ inserted into the first battery compartment 17, two battery cells $C_B$ inserted into the second battery compartment 23, and two battery cells $C_C$ inserted into the third battery compartment 25. Each of the battery cells $C_A$, $C_B$, $C_C$ comprises two metal tabs 19. All the metal tabs 19 are directly connected to a printed circuit board 13 which is connected to the laptop by cables 15. In one or more embodiments, the battery cells $C_A$, $C_B$, $C_C$ may be arranged in two cell blocks connected in series, with each cell block comprising three battery cells connected in parallel (i.e., a 2S3P configuration). In other embodiments, the battery cells $C_A$, $C_B$, $C_C$ may be arranged in one cell block with six battery cells connected in parallel (i.e., a 1S6P configuration). The battery cells $C_A$, $C_B$, $C_C$ may be lithium-ion battery cells.

In one or more embodiments, the battery compartments 17, 23, 25 may be configured to accept different sized batteries to maximize space efficiency and increase the total capacity of the battery pack 10. For example, as shown in FIG. 2, the battery cells $C_B$ may each have a smaller size than the battery cells $C_A$, neither of which would fit into the smaller second battery compartment 23. Furthermore, the battery cells $C_A$ may each have a smaller size than the battery cells $C_C$, neither of which would fit into the first compartment 17 which has the battery cells $C_A$. In one or more embodiments, using the battery cells $C_B$ and $C_C$ together with the battery cells $C_A$ may increase the total capacity of the battery pack 10 compared to using only the battery cells $C_A$. Such a battery pack including cells of different size, capacity, and impedance will be referred to herein as a "hybrid" battery pack.

Although FIG. 2 shows three pairs of battery cells, the battery pack according to one or more embodiments may have fewer or more battery cells connected in a variety of configurations depending on the specific requirements, dimensions, and design of the portable electronic device, as will become clear to a person of ordinary skill from the descriptions that follow.

FIGS. 3-8 and the corresponding descriptions below illustrate exemplary schematic representations according to one or more embodiments.

Figure 3:
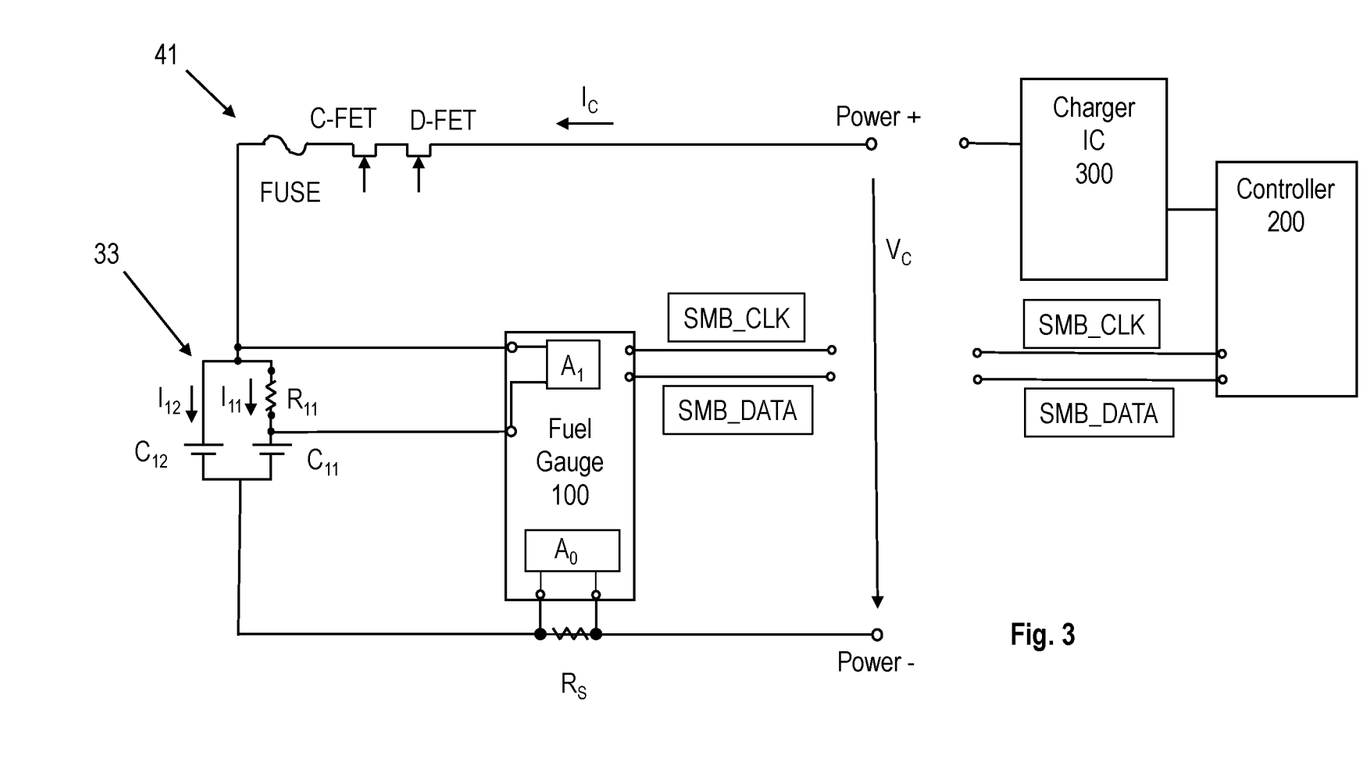
FIG. 3 shows a schematic diagram of a battery pack according to one or more embodiments.

FIG. 3 shows a schematic diagram of a hybrid battery pack 41 for a portable electronic device according to one or more embodiments. The battery pack 41 comprises a first cell block 33 with a first battery cell $C_{11}$ and second battery cell $C_{12}$ connected to each other in parallel. In one or more embodiments, the first battery cell $C_{11}$ may be smaller in size and capacity than the second battery cell $C_{12}$ and may therefore be fitted into a space within the portable electronic device that would be too small for a larger battery cell. The battery pack 41 further comprises a positive terminal "power +" and a negative terminal "power −" for charging the battery pack 41 with a total charging voltage $V_C$ and a total charging current $I_C$.

In general, if the total charging current flowing through a battery cell is higher than a predefined threshold or overcurrent value, the battery cell may suffer degradation. The threshold or overcurrent value of each battery cell may be defined by the manufacturer of the battery cells.

In the example shown in FIG. 3, a fuel gauge 100 comprises a comparator $A_0$ which determines a total charging current $I_C$ flowing through the battery pack 41 by measuring a sensing voltage across a sensing resistor $R_S$ connected in series to the first cell block 33. The total charging current $I_C$ is a sum of a first charging current $I_{11}$ flowing through the first battery cell $C_{11}$ and a second charging current $I_{12}$ flowing through the second battery cell $C_{12}$. The fuel gauge 100 detects an overcurrent of the total charging current $I_C$ and reduces the total charging current $I_C$ in response to detecting the overcurrent.

Additionally, a first measuring resistor $R_{11}$ is connected in series to the first battery cell $C_{11}$. The fuel gauge 100 measures the voltage across the first measuring resistor $R_{11}$ and determines a value of the first charging current $I_{11}$ therefrom. Then, the fuel gauge 100 compares the value of the first charging current $I_{11}$ with a first overcurrent value $I_{11}^{max}$ the first battery cell $C_{11}$. In one or more embodiments, the fuel gauge 100 obtains the first overcurrent value $I_{11}^{max}$ from a memory or storage device. Upon detecting that the first charging current $I_{11}$ has exceeded the first overcurrent value $I_{11}^{max}$, the fuel gauge 100 generates and transmits the overcurrent signal (reduced charging current value) to a controller 200.

The controller 200 is connected to a charger IC 300, which in turn is connected to the positive terminal "power +" of the battery pack 41. The controller 200 is connected to the fuel gauge 100 via a System Management Bus (SMB). The SMB comprises two wires SMB_CLK and SMB_DATA. The SMB_DATA wire transfers data packages and the SMB_CLK wire stamps the data packages with a time stamp. In one or more embodiments, the controller 200 may be an embedded controller firmware (ECFW) of the portable electronic device. In other embodiments, the controller 200 may be part of the battery pack 41.

In response to receiving the overcurrent signal, the controller 200 reduces the total charging current $I_C$ of the battery pack 41 via the charger IC 300 so that the first charging current $I_{11}$ falls below the first overcurrent value $I_{11}^{max}$. As a result, the first battery cell $C_{11}$ can be protected from overcurrent despite being smaller and more susceptible to overcurrent than the second battery cell $C_{12}$.

Furthermore, the battery pack 41 comprises a FUSE, a C-FET, and a D-FET all connected in series to the first cell block 33 and controlled by the fuel gauge 100. When the total charging current $I_C$ reaches a maximum current (e.g., 1.5 A), which is determined by the comparator $A_0$, the fuel gauge 100 generates and transmits an overcurrent signal (reduced charging current value) to the controller 200 to reduce the total charging current $I_C$. When a more severe condition is detected by the fuel gauge 100 such as an abnormal high voltage of one of the first or second battery cells $C_{11}$, $C_{12}$, determined by the comparator $A_0$ of the fuel gauge 100, the fuel gauge 100 blows the FUSE. The battery pack 41 is then disabled.

In one or more embodiments, the fuel gauge 100 may comprise a first comparator $A_1$ connected to the first measuring resistor $R_{11}$ to determine the value of the first charging current $I_{11}$. The first comparator $A_1$ compares the value of the first charging current $I_{11}$ with the first overcurrent value $I_{11}^{max}$ and generates the overcurrent signal (to request reduction of charging current to controller 200) upon detecting that the first charging current $I_{11}$ has exceeded the first overcurrent value $I_{11}^{max}$. In one or more embodiments, the first comparator $A_1$ may also transmit the overcurrent signal to the controller 200. In one or more embodiments, the first comparator $A_1$ may be embedded in the fuel gauge 100. In other embodiments, the first comparator $A_1$ may be external to the fuel gauge 100.

Figure 4:
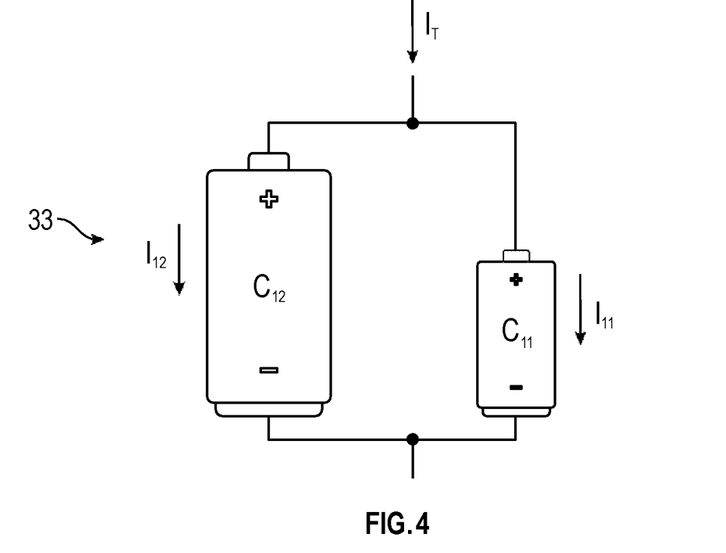
FIG. 4 shows an example of a cell block of FIG. 3.

FIG. 4 shows an example of the first cell block 33 of FIG. 3 according to one or more embodiments. The size and capacity of the first battery cell $C_{11}$ is smaller than the size and capacity of the second battery cell $C_{12}$. Consequently, the first overcurrent value $I_{11}^{max}$ of the first battery cell $C_{11}$ is lower than a second overcurrent value $I_{12}^{max}$ of the second battery cell $C_{12}$. For example, the first battery cell $C_{11}$ may have a capacity of 2 Wh and an overcurrent value (i.e., the first overcurrent value $I_{11}^{max}$) of 0.3 A, while the second battery cell $C_{12}$ may have a capacity of 4 Wh and an overcurrent value (i.e., the second overcurrent value $I_{12}^{max}$) of 0.7 A. During normal operation, the first and second battery cells $C_{11}$, $C_{12}$ form a current divider circuit. In one or more embodiments, it is assumed that a total current of 1.0 A is supplied to the first cell block 33. In this case, the first charging current $I_{11}$ flowing through the first battery cell $C_{11}$ is 0.3 A and the second charging current $I_{12}$ flowing through the second battery cell $C_{12}$ is 0.7 A. For example, an overcurrent may occur in the first battery cell $C_{11}$ due to instability of internal impedance of the first or second battery cell $C_{11}$, $C_{12}$ caused by aging, noise in the total charging current $I_C$, aging and degrading of components of the battery pack, or failure of the battery pack. Since the capacity of the first battery cell $C_{11}$ is lower than the capacity of the second battery cell $C_{12}$, particularly the first battery cell $C_{11}$ is susceptible to damage due to the relatively greater effects of overcurrent with respect to its first overcurrent value $I_{11}^{max}$. In this regard, even though the first battery cell $C_{11}$ has the lower overcurrent value, one or more embodiments can effectively protect the first battery cell $C_{11}$ against overcurrent damage. Thus, the smaller first battery cell $C_{11}$ may safely be fitted into a smaller space within the portable electronic device that would otherwise be left empty, thereby increasing the overall capacity of the battery pack 41.

Figure 5:
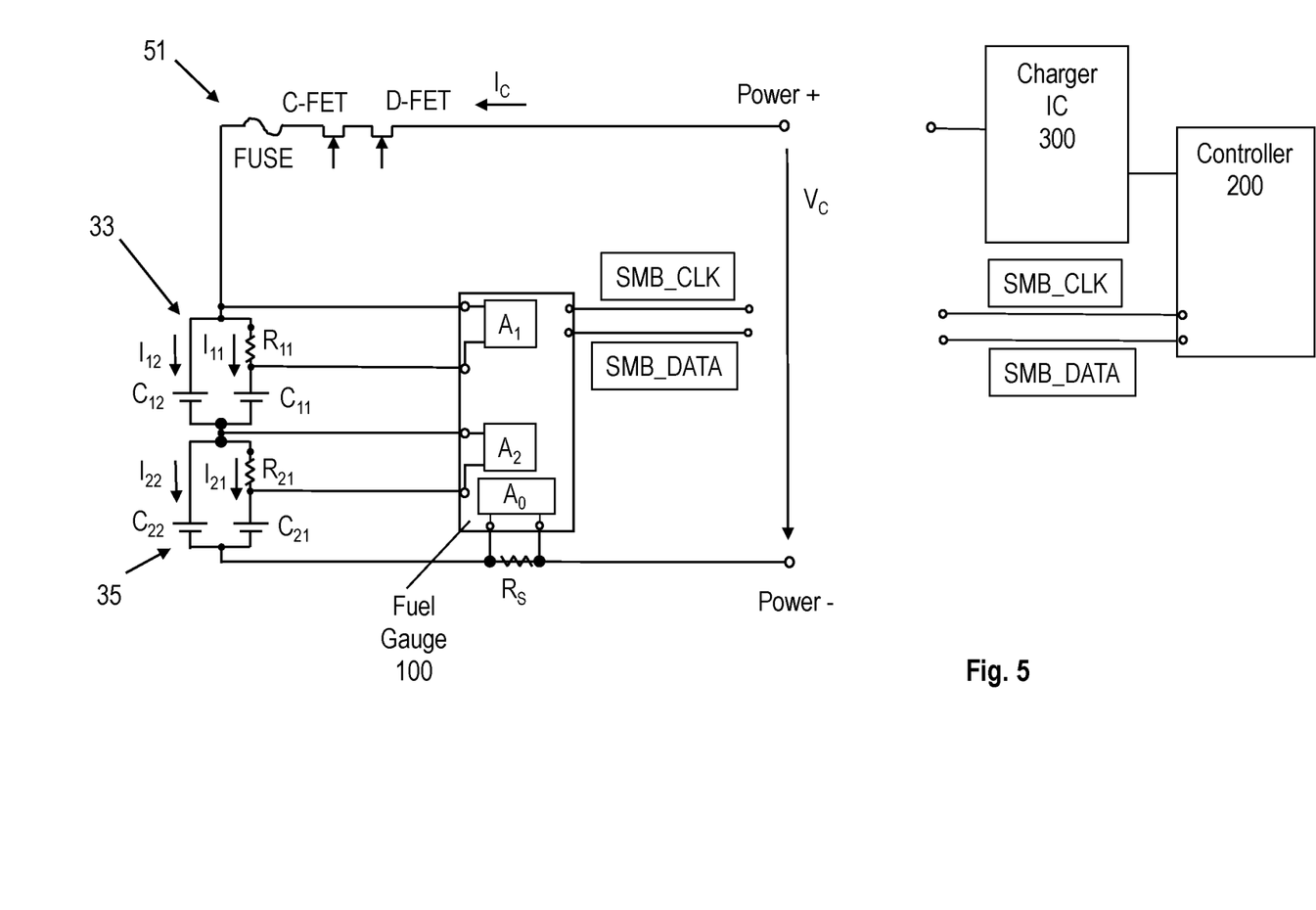
FIG. 5 shows another schematic diagram of a battery pack according to one or more embodiments.

FIG. 5 shows another schematic diagram of a hybrid battery pack 51 according to one or more embodiments. Compared to the battery pack 41 shown in FIG. 3, the battery pack 51 additionally comprises a second cell block 35 with a first battery cell $C_{21}$ and a second battery cell $C_{22}$. In one or more embodiments, the first battery cell $C_{21}$ may be smaller in size and capacity than the second battery cell $C_{22}$ and may therefore be fitted into a space within the portable electronic device that would be too small for a larger battery cell.

The battery pack 51 additionally comprises, for the second cell block 35, a first measuring resistor $R_{21}$ connected in series to the first battery cell $C_{21}$. The fuel gauge 100 measures the voltage across the first measuring resistor $R_{21}$ and determines a value of the first charging current $I_{21}$ therefrom. Then, the fuel gauge compares the value of the first charging current $I_{21}$ with a first overcurrent value $I_{21}^{max}$ of the first battery cell $C_{21}$. In one or more embodiments, the fuel gauge 100 obtains the first overcurrent value $I_{21}^{max}$ from a memory or storage device. Upon detecting that the first charging current $I_{21}$ has exceeded the first overcurrent value $I_{21}^{max}$, the fuel gauge generates and transmits an overcurrent signal.

Thus, for the first cell block 33, when the first charging current $I_{11}$ exceeds the first overcurrent value $I_{11}^{max}$, the fuel gauge 100 detects an overcurrent and outputs an overcurrent signal to the controller 200. The controller 200 then reduces the charging current $I_C$ of the battery pack 51 via the charger IC 300 regardless of an overcurrent of the first battery cell $C_{21}$ of the second cell block 35.

Similarly, for the second cell block 35, when the first charging current $I_{21}$ exceeds the first overcurrent value $I_{21}^{max}$, the fuel gauge 100 detects an overcurrent and outputs an overcurrent signal to the controller 200. The controller 200 then reduces the charging current $I_C$ via the charger IC 300 regardless of an overcurrent of the first battery cell $C_{11}$ of the first cell block 33.

Compared to the battery pack 41 shown in FIG. 3, the fuel gauge 100 may additionally comprise a second comparator $A_2$ for the second cell block 35. The comparator $A_2$ is connected to the first measuring resistor $R_{21}$ to determine the value of the first charging current $I_{21}$. The second comparator $A_2$ compares the value of the first charging current $I_{21}$ with the first overcurrent value $I_{21}^{max}$ and generates the overcurrent signal upon detecting that the first charging current $I_{21}$ has exceeded the first overcurrent value $I_{21}^{max}$. The comparator $A_2$ may also transmit the overcurrent signal to the controller 200. In one or more embodiments, the second comparator $A_2$ may be embedded in the fuel gauge 100. In other embodiments, the second comparator $A_2$ may be external to the fuel gauge 100.

Figure 6:
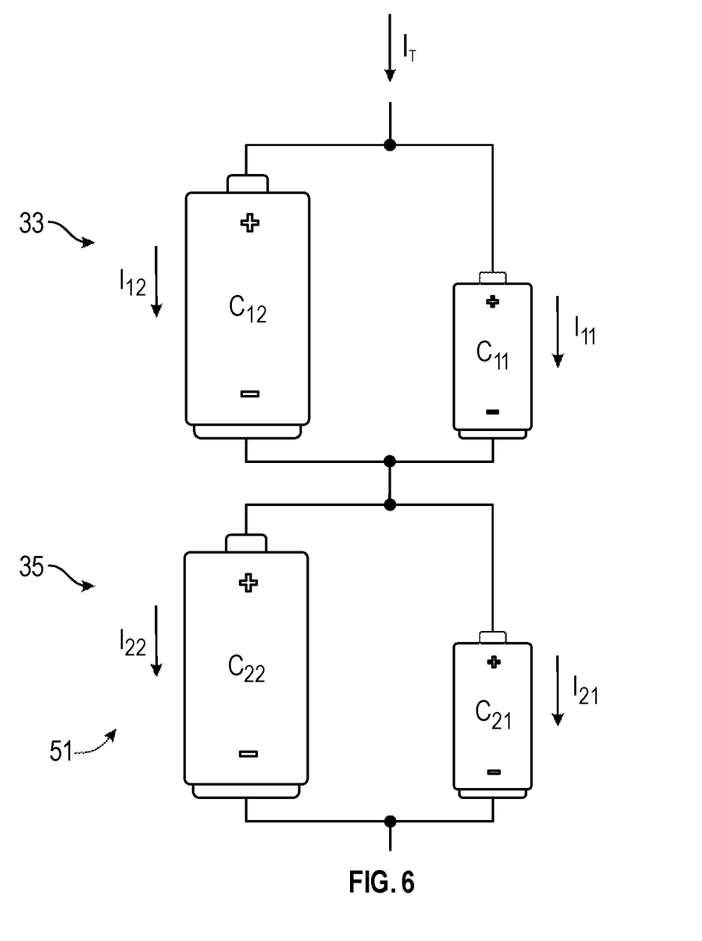
FIG. 6 shows an example of cell blocks of FIG. 5.

FIG. 6 shows an example of the first cell block 33 and second cell block 35 of the battery pack 51 of FIG. 5 according to one or more embodiments. With respect to the first cell block 33, the first battery cell $C_{11}$ has a size and capacity smaller than the second battery cell $C_{12}$. Similarly, with respect to the second cell block 35, the first battery cell $C_{21}$ has a size and capacity smaller than the second battery cell $C_{22}$.

Figure 7:
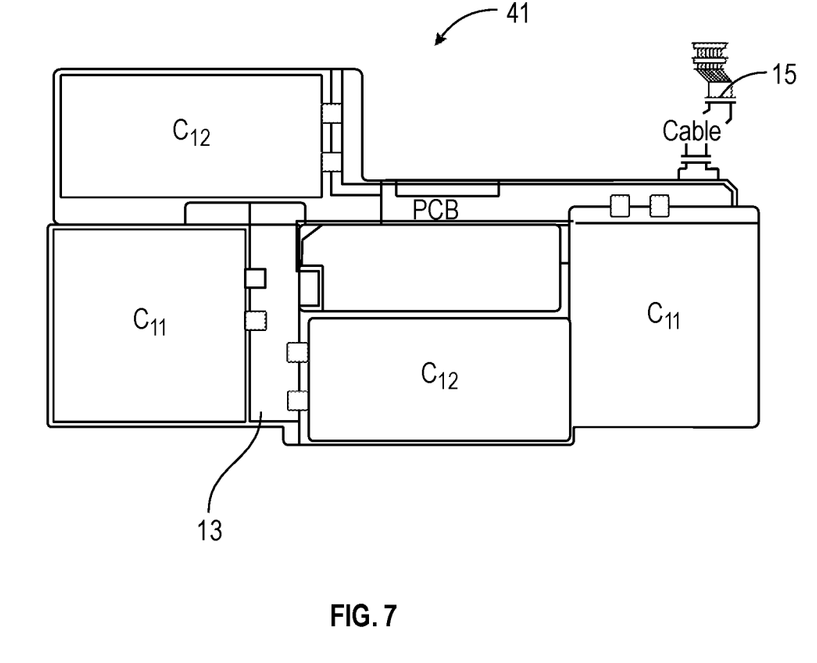
FIG. 7 shows a top view of a battery pack of FIG. 5 according to one or more embodiments.

The battery cells of the battery pack according to one or more embodiments may be arranged in any configuration that is suitable for the specific portable electronic device. For example, in one or more embodiments, the battery cells shown in FIG. 6 may be arranged as shown in FIG. 7.

Figure 8:
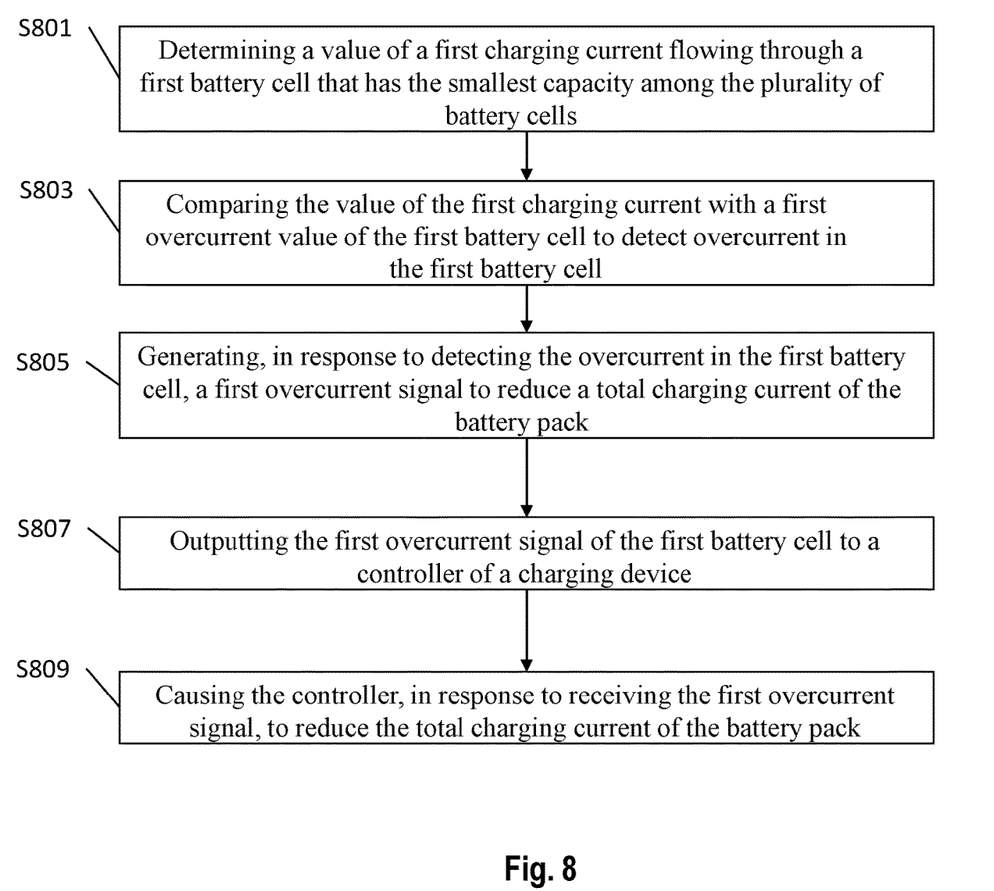
FIG. 8 shows a flowchart of a method for controlling a charge of the battery pack according to one or more embodiments.
Figure 9:
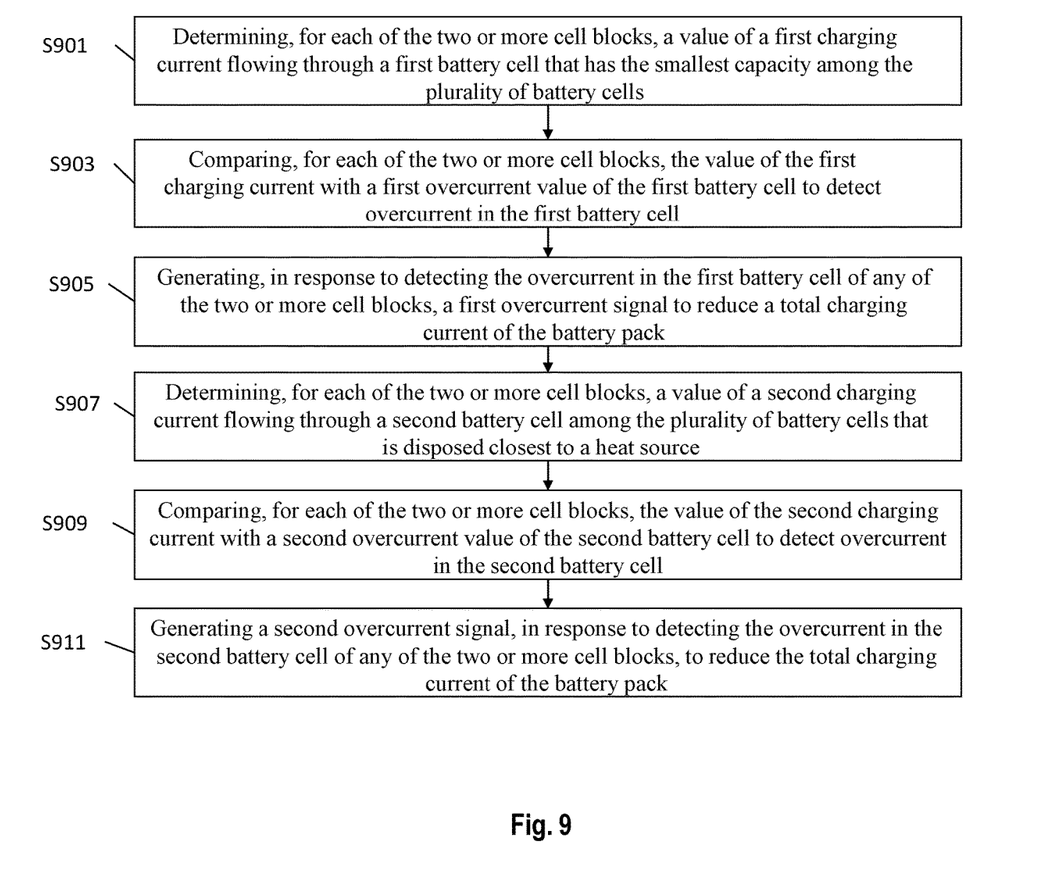
FIG. 9 shows another flowchart of the method for controlling a charge of the battery pack according to one or more embodiments.

FIGS. 8 and 9 illustrate flowcharts in accordance with one or more embodiments. One or more of the steps shown in the flowcharts may be omitted, repeated, and/or performed in a different order than the order shown in FIGS. 9 and 10. Accordingly, the scope of the invention should not be considered limited to the specific arrangement of steps shown in these figures.

FIG. 8 shows a flowchart of the method for controlling a charging of a battery pack with just one cell block according to one or more embodiments. The method comprises determining a value of a first charging current flowing through a first battery cell that has the smallest capacity among the plurality of battery cells (step S801); comparing the value of the first charging current with a first overcurrent value of the first battery cell to detect overcurrent in the first battery cell (step S803); generating, in response to detecting the overcurrent in the first battery cell, a first overcurrent signal to reduce a total charging current of the battery pack (step S805); outputting the first overcurrent signal of the first battery cell to a controller of a charging device (step S807); and causing the controller, in response to receiving the first overcurrent signal, to reduce the total charging current of the battery pack (step S809).

FIG. 9 shows a flowchart of the method for controlling a charging of a battery pack with two or more cell blocks according to one or more embodiments. The method comprises determining, for each of the two or more cell blocks, a value of a first charging current flowing through a first battery cell that has the smallest capacity among the plurality of battery cells (step S901); comparing, for each of the two or more cell blocks, the value of the first charging current with a first overcurrent value of the first battery cell to detect overcurrent in the first battery cell (step S903); generating, in response to detecting the overcurrent in the first battery cell of any of the two or more cell blocks, a first overcurrent signal to reduce a total charging current of the battery pack (step S905); determining, for each of the two or more cell blocks, a value of a second charging current flowing through a second battery cell among the plurality of battery cells that is disposed closest to a heat source (step S907); comparing, for each of the two or more cell blocks, the value of the second charging current with a second overcurrent value of the second battery cell to detect overcurrent in the second battery cell (step S909); and generating a second overcurrent signal, in response to detecting the overcurrent in the second battery cell of any of the two or more cell blocks, to reduce the total charging current of the battery pack (step S911).

One or more of the embodiments of the invention may have one or more of the following improvements to battery packs for portable electronic devices: battery packs are less susceptible to degradation; the decrease of capacity of battery packs is slowed down; the shortening of the discharge cycles of battery packs is slower in the long run. These advantages demonstrate that one or more embodiments of the present invention improve the management and monitoring of battery packs, in particular the state of charge of battery packs.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for controlling a charging of a battery pack for a portable electronic device, wherein the battery pack comprises one or more cell blocks each comprising a plurality of battery cells connected in parallel, the method comprising:
   determining, by a first comparator connected to a sensing resistor connected in series to the one or more cell blocks, a total charging current flowing through the battery pack;
   determining, by a second comparator connected to a first measuring resistor connected in series to a first battery cell, for each of the one or more cell blocks, a value of a first charging current flowing through the first battery cell that has a smaller capacity among the plurality of battery cells;
   comparing, by the second comparator, for each of the one or more cell blocks, the value of the first charging current with a first overcurrent value of the first battery cell to detect overcurrent in the first battery cell; and
   generating, by the second comparator, in response to detecting the overcurrent in the first battery cell of any of the one or more cell blocks, a first overcurrent signal to reduce a total charging current of the battery pack.

2. The method according to claim 1, wherein the battery pack has just one cell block, and the method further comprises:
   outputting the first overcurrent signal of the first battery cell of the one cell block to a controller of a charging device; and
   causing the controller, in response to receiving the first overcurrent signal, to reduce the total charging current of the battery pack.

3. The method according to claim 2, wherein the charging device is the portable electronic device or a battery charger for the battery pack.

4. The method according to claim 1, wherein the overcurrent signal is output only in response to receiving the first overcurrent signal from at least two of the cell blocks.

5. The method according to claim 1, wherein
   the battery pack has two or more cell blocks, and
   the method further comprises:
      determining, for each of the two or more cell blocks, a value of a second charging current flowing through a second battery cell among the plurality of battery cells that is disposed closest to a heat source;
      comparing, for each of the two or more cell blocks, the value of the second charging current with a second overcurrent value of the second battery cell to detect overcurrent in the second battery cell; and
      generating a second overcurrent signal, in response to detecting the overcurrent in the second battery cell of any of the two or more cell blocks, to reduce the total charging current of the battery pack.

6. A battery pack for a portable electronic device, comprising:
   one or more cell blocks each comprising a plurality of battery cells connected in parallel; and
   a fuel gauge comprising:
      a first comparator connected to a sensing resistor connected in series to the one or more cell blocks, wherein the first comparator determines a total charging current flowing through the battery pack, and
      a second comparator connected to a first measuring resistor connected in series to a first battery cell, wherein the second comparator:
         determines a value of a first charging current flowing through the first battery cell that has a smaller capacity among the plurality of battery cells,
         compares the value of the first charging current with a first overcurrent value of the first battery cell to detect overcurrent in the first battery cell, and
         generates, in response to detecting the overcurrent in the first battery cell, a first overcurrent signal to reduce a total charging current of the battery pack.

7. The battery pack according to claim 6, wherein
   the battery pack has just one cell block,
   the fuel gauge outputs the first overcurrent signal of the first battery cell to a controller of a charging device, and
   the first overcurrent signal causes the controller to reduce the total charging current of the battery pack.

8. The battery pack according to claim 7, wherein the charging device is the portable electronic device or a battery charger for the battery pack.

9. The battery pack according to claim 6, wherein the fuel gauge only outputs the overcurrent signal in response to receiving the first overcurrent signal from at least two of the cell blocks.

10. The battery pack according to claim 6, further comprising:
   two or more cell blocks, wherein the fuel gauge
      determines a value of a second charging current flowing through a second battery cell among the plurality of battery cells that is disposed closest to a heat source,
      compares the value of the second charging current with a second overcurrent value of the second battery cell to detect overcurrent in the second battery cell, and
      generates, in response to detecting the overcurrent in the second battery cell, a second overcurrent signal to reduce the total charging current of the battery pack.

11. A portable electronic device comprising the battery pack according to claim 6.

12. A battery charger comprising the battery pack according to claim 6.

* * * * *